United States Patent [19]
Habegger et al.

[11] Patent Number: 4,767,389
[45] Date of Patent: Aug. 30, 1988

[54] DRIVING BELT

[75] Inventors: Fernand Habegger, Biel-Benken; Niklaus Polt, Basel; Kurt Gröbli, Münchenstein, all of Switzerland

[73] Assignee: Habasit AG, Reinach, Switzerland

[21] Appl. No.: 32,717

[22] Filed: Apr. 1, 1987

[30] Foreign Application Priority Data

Apr. 8, 1986 [CH] Switzerland ............... 1381/86

[51] Int. Cl.$^4$ ............................................. F16G 1/10
[52] U.S. Cl. .................................. 474/266; 474/263; 474/268
[58] Field of Search ............... 474/263, 264, 266–268, 474/270

[56] References Cited

U.S. PATENT DOCUMENTS 4,157,752  6/1979  Sick et al. ................. 474/263 X
4,169,393  10/1979  Wetzel et al. ............... 474/268 X Primary Examiner—Stephen J. Novosad
Assistant Examiner—Thuy M. Bui
Attorney, Agent, or Firm—Wenderoth, Lind & Ponack

[57] ABSTRACT

A driving belt has a textile supporting element composed of multi-functional threads or yarns which contain plastic fibers of high breaking strength and heat-resistant natural fibers. The driving belt also contains an electrically conductive element. The supporting element is connected to a non-crosslinked plastic covering to form an asymmetric structure. The textile supporting element can be impregnated on the side facing away from the plastic covering. The electrically conductive element is either an electrically conductive filament in the multifunctional thread or yarn or an electrically conductive layer between the supporting element and the plastic covering. This asymmetric structure results in a favorable kinematic operating behavior and high efficiency, because the neutral bending plane of the belt comes to rest at a point very near the contact surface of an element to be driven. Together with the anti-static properties and the positive connection between the supporting element and the plastic covering, the driving belt prevents the adhesion of fiber fly and makes it possible to cut it off from a supply roll as desired and connect the belt ends without any impact effect during passage over a spindle.

18 Claims, 2 Drawing Sheets

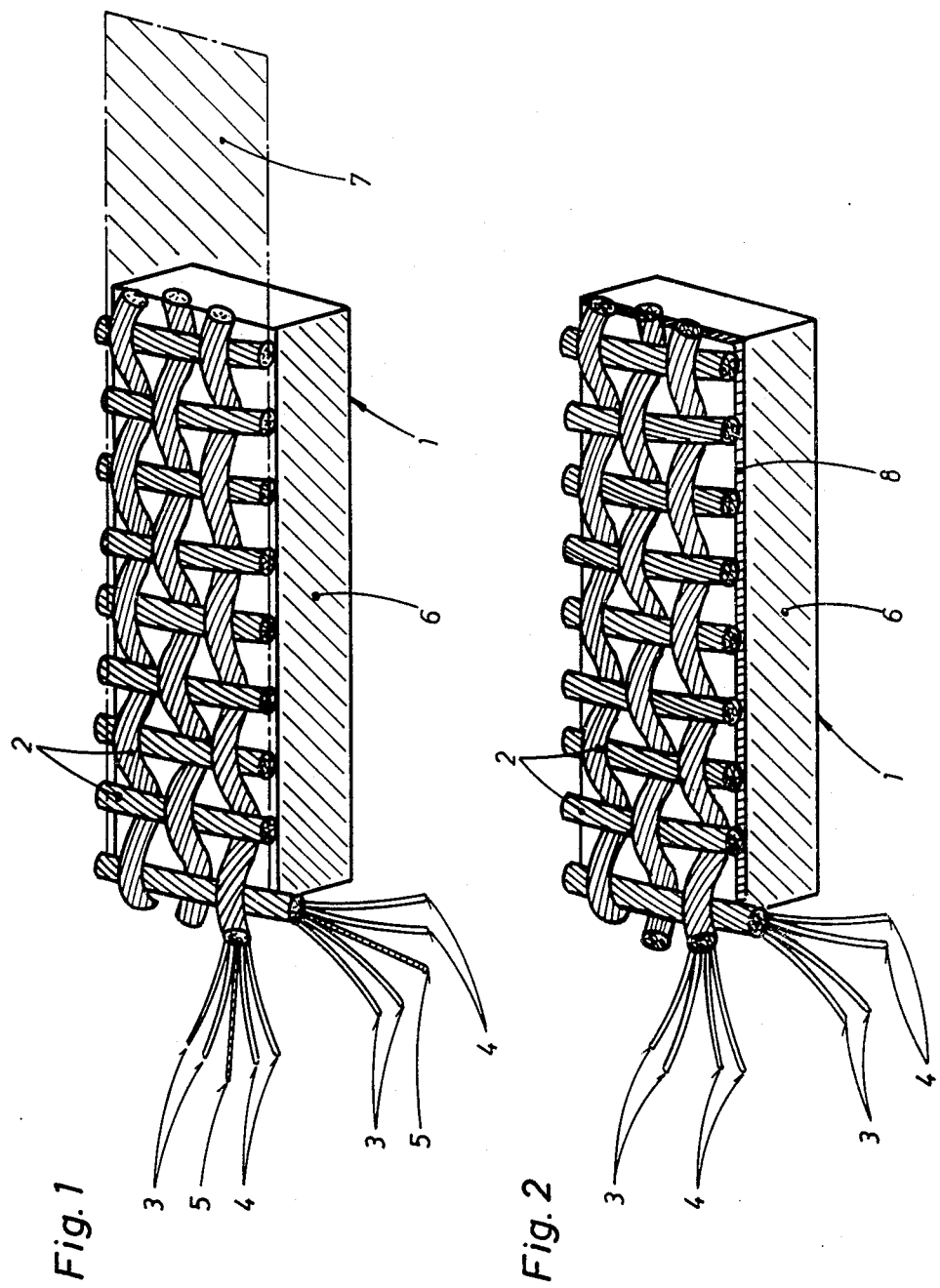

DRIVING BELT

BACKGROUND OF THE INVENTION

The invention relates to driving belts, such as are used particularly as power and speed transmission elements on spindle mechanisms in the textile industry. Such driving belts are obtainable in the trade in various embodiments. These known types are described below.

Driving belts composed of cotton or plastic fibers, which are woven to a specific width and which are connected continuously by means of sewing or adhesive bonding, are traditionally in very common use. Moreover, driving belts of this type which are produced continuously to the particular dimensions ordered are also on the market. Driving belts cut out in strip form from web material with several fabric plies and joined together continuously are a further development. The advantage of these is that the belts can be cut out from the web material in the particular width desired, the ends being connected together by adhesive bonding. Finally, driving belts produced from plastic by extrusion are also known.

All these known driving belts have considerable disadvantages in view of the most important requirements of the textile industry, namely reliable handling, operating safety and energy savings in operation. Thus, the connections of the belt ends made by means of adhesives or by etching with solvents are insufficiently pliable and durable. Besides, these connecting processes, in all the high outlay, are somewhat harmful to health and are also not environmentally safe. Consequently, instead of adhesives, bonding sheets are inserted between the belt ends to be connected; but in this case a thickening and stiffening of the junction have to be accepted. Moreover, the use of bonding sheets is not economical.

On the other hand, although the driving belts woven to a specific width are very pliable and, if they are composed of cotton or similar fibers, also relatively heat-resistant, nevertheless during each pass of a spindle the ends of these driving belts bonded or sewn with an overlap exert an impact effect which is detrimental to the service life of the belt and to the spindle mounting. Moreover, these driving belts are not anti-static and therefore, because fiber fly adheres to them, lead to uncontrolled slipping and consequently to low efficiency.

With driving belts produced from web material with several fabric plies, a change was made with some success to the use of plastic fibers of high breaking strength as warp filaments and relatively heat-resistant fibers as weft filaments. It is also known to combine a fabric ply of plastic with one of cotton, an anti-static intermediate layer often being incorporated, in order to prevent fiber fly from adhering. However, these driving belts, because they are less pliable, require more drive power to operate them. Furthermore, this special multi-layer structure results in disadvantages, particularly as regards layer adhesion, the connection of the ends of the driving belt and fraying of the edges.

Continuously woven driving belts and those produced from plastics by extrusion have not been successful in capturing an appreciable share of the market. Where continuously woven driving belts are concerned, production and stock-keeping are not economical. As regards one-piece driving belts produced by extrusion, the requirements with respect to adhesive properties cannot be properly satisfied.

SUMMARY OF THE INVENTION

The primary object of the invention is, therefore, to provide a driving belt which does not have these disadvantages. To guarantee operation which is as economically efficient as possible in the light of the statements made above, a whole series of functional requirements must nevertheless be satisfied at the same time.

Thus, it must be possible for the consumer to cut the driving belt off from a supply roll, without loss, to the desired length and width and connect its ends in a simple way, without using adhesives, solvents or the like, so that there is no thickening or stiffening of the junction which would lead to an impact effect during passage over spindles. Another important concern is to improve the efficiency in relation to the known driving belts, this being expressed in a minimum slip, resulting in minimum speed losses and a maximum saving of drive energy. So that the driving belt can absorb the load in the pulling direction and guarantee transmission of high speeds via small pulley diameters, with as low an outlay in energy terms as possible, the modulus of elasticity must be as high as possible and correspondingly the stretching of the belt must be as low as possible. The nature of the two surfaces of the driving belt also has a decisive influence on its operating behavior, since, when a thread breaks, the spindles are each braked by hand and then accelerated rapidly again. Finally, the driving belt must be anti-static, to prevent the attraction of fiber fly occurring as a result of an electrostatic charge.

The driving belt according to the invention was developed as the result of practical laboratory tests and the knowledge obtained from these, and it has a novel combination of material properties which surprisingly satisfy in an ideal way the high operating requirements as regards flexibility, tensile strength, heat-resistance and adhesive and anti-static behavior and at the same time guarantee reliable handling, high operating safety and a great energy saving.

The invention thus relates to a driving belt with a textile supporting element, wherein the textile supporting element is composed of multi-functional threads or yarns containing plastic fibers of high breaking strength and heat-resistant natural fibers, wherein the driving belt contains an electrically conductive element, and wherein the textile supporting element is connected to a non-crosslinked plastic covering. The textile supporting element can be impregnated on the side facing away from the plastic covering. The electrically conductive element can be composed of electrically conductive filaments in the multi-functional threads or yarns or of an electrically conductive layer between the textile supporting element and the plastic covering.

BRIEF DESCRIPTION OF THE DRAWINGS

Two exemplary embodiments of the invention are described below with reference to the accompanying drawings, wherein:

FIG. 1 is a simplified perspective representation of a portion of a driving belt according to the invention;

FIG. 2 is a simplified perspective representation of a portion of another driving belt according to the invention;

DETAILED DESCRIPTION OF THE INVENTION

Figure 3A:
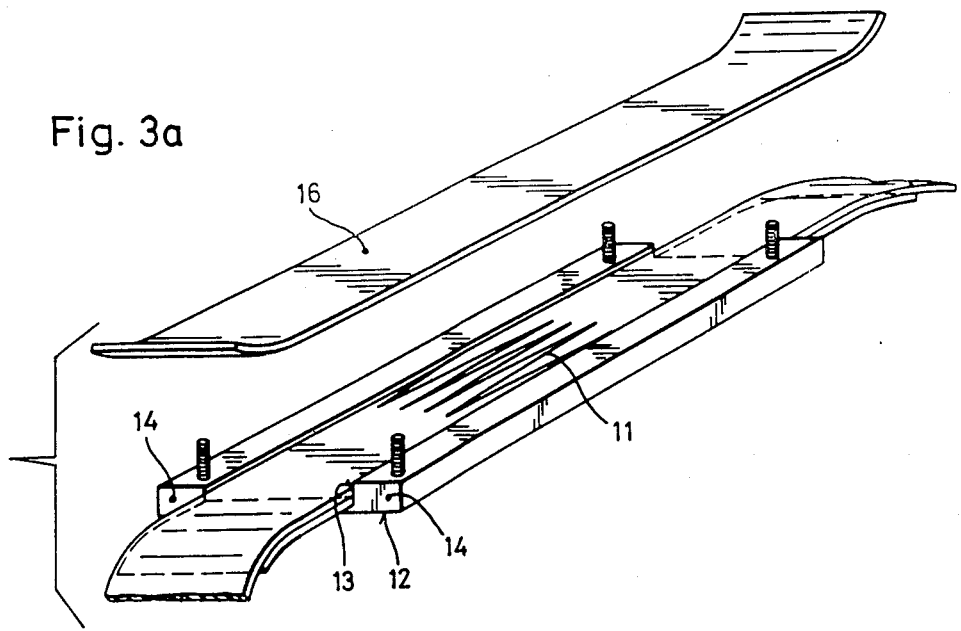
FIGS. 3a–3c are perspective views of three different phases of parts of an apparatus which can be used for connecting the belts.

FIG. 1 shows a driving belt 1 with a textile supporting element 2 which is composed of multi-functional threads or yarns. The threads or yarns contain plastic fibers 3 of high breaking strength, heat-resistant natural fibers 4 and electrically conductive filaments 5. The supporting element 2 is also connected to a non-crosslinked plastic covering 6.

The plastic fibers 3 of high breaking strength, which are composed, for example, of polyester, preferably polyethylene terephthalate, or polyamide and which preferably have a breaking strength of more than 30 cN/tex, give the driving belt tensile strength and dimensional stability. The heat-resistant natural fibers 4, which are composed, for example, of cellulose, preferably cotton or ramie fiber, and which are preferably heat-resistant up to at least 150° C., give the driving belt heat resistance and abrasion resistance. The electrically conductive filaments 5, which are, for example, metal filaments or carbon fibers, given the driving belt antistatic properties. The non-crosslinked plastic covering 6, which is composed, for example, of a thermoplastic, preferably a polyurethane, gives the driving belt the necessary coefficient of friction and allows the belt ends to be connected without a thickening or stiffening of the junction and consequently without an impact effect during passage of the belt over spindles.

FIG. 2 shows another embodiment of the driving belt 1, in which the multi-functional threads or yarns contain only plastic fibers 3 of high breaking strength and heat-resistant natural fibers 4. In this case, the electrically conductive element is an electrically conductive layer 8, preferably a soot-containing adhesion-promoting layer, between the textile supporting element 2 and the plastic covering 6.

In the two embodiments of the driving belt according to the invention, which are shown in FIGS. 1 and 2, the novel material combination ensures a favorable kinematic operating behavior, since, as a result of the asymmetric design of the driving belt, the neutral bending plane 7 is shifted to a point very near the surface of the spindles which have a small diameter. The high bending elasticity results in a long average service life and, in conjunction with a low stretch-related slip and correspondingly small speed loss, in a high degree of efficiency.

The novel multi-functional threads or yarns have also brought about a series of further technical advances. They make it possible to produce more tightly closed fabrics and consequently ensure increased resistance to fraying and abrasion. Moreover, these threads or yarns result in a more fleecy fabric surface which has a higher noise-reducing capacity and which assists bonding to the plastic covering.

Further advantages of the driving belt according to the invention arise because the resistance to heat and to abrasion is increased by the use of natural fibers and the adhesion of the fiber fly, occurring in practice as a result of the electrostatic charging of the driving belt, is prevented by the presence of an electrically conductive element, that is to say the electrically conductive filaments 5 or electrically conductive layer 8, and, if appropriate, by the impregnation of the textile supporting element, preferably with a crosslinked plastic, for example a crosslinked polyurethane. The size of the driving belt facing away from the plastic covering 6, that is to say the surface of the supporting element 2, is characterized by the best possible coefficient of friction which makes it possible both to stop a spindle in the event of a thread break or for the purpose of a bobbin change and to achieve a short spindle run-up time.

On the other hand, the plastic covering 6 has a high coefficient of friction, thus allowing slip-free power transmission even at extremely high speeds of the driving belt. Furthermore, the high coefficient of friction guarantees that the speeds remain constant over all the spindles of a machine and that the spindles, after stopping in the event of a thread break or for the purpose of a bobbin change, can be accelerated rapidly again, even over long-term operation. Finally, the good bonding of the plastic covering 6 to the supporting element 2 guarantees clean cutting edges which prevent mechanical adhesion of fiber fly as a result of the lateral fraying of the driving belt or the protrusion of fiber fibrils. The fact that the plastic covering 6, which can be produced with very narrow thickness tolerances, is provided with a surface structure particularly suitable for specific operating conditions also contributes to a long service life.

The driving belt according to the invention guarantees not only a good operating behavior, but also reliable handling. This is especially important during the connection of the ends of the driving belt, which, in view of the large number of spindles used, it must be possible for unskilled labor to carry out simply and without solvents or posttreatment.

Figure 3B:
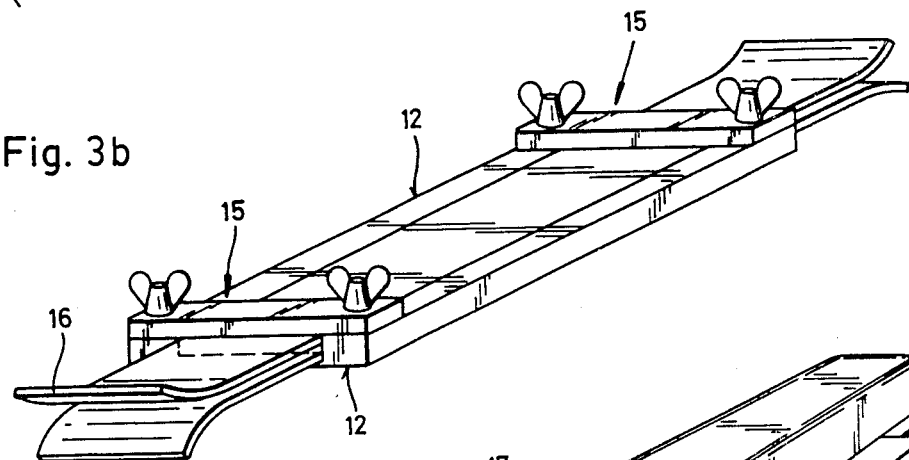
Figure 3C:
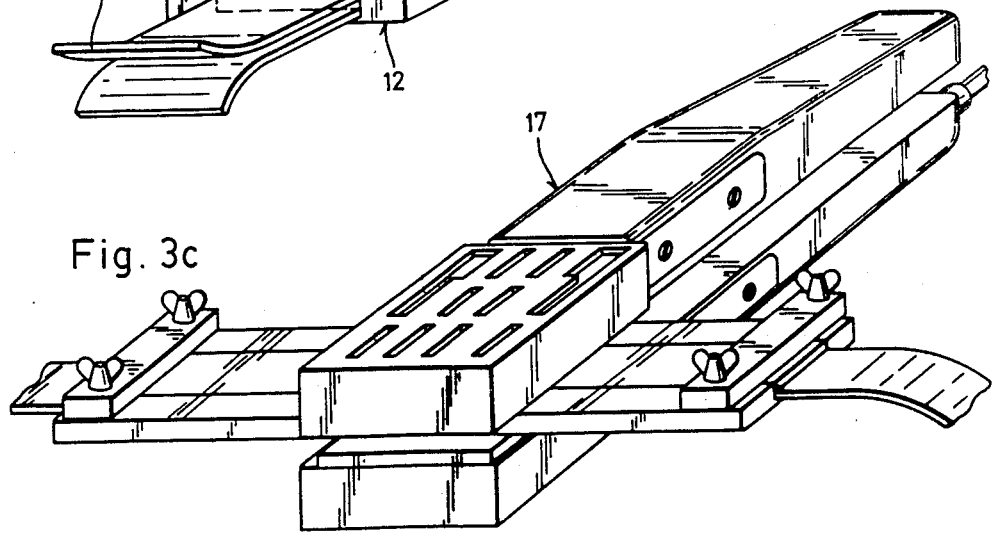

For this purpose, as shown in FIG. 3a, the band ends 11 stamped out in the form of fingers are inserted, so as to engage in one another, into a guide rail 12 which is equipped with a guide channel 13 and lateral limitations 14. A cover plate 16 pressed down by means of clamps 15 prevents any subsequent shifting of the ends to be connected, in order to guarantee that the band ends are connected in a straight line (FIG. 3b). The guide rail 12 is then introduced into a heated press 17 (see German utility model no. 83 32 647), in which the plastic covering is melted under the influence of pressure and heat and a non-positive connection between the band ends is made by fusion welding. The supporting element 2 is interleaved as a result of the finger-like toothing 11 of the band ends, so that only a slight loss of tensile strength of the order of 10% occurs at the junction. It goes without saying that, at the same time, there is no thickening at the junction. This process thus results in a homogeneous connection between the band ends to form a driving belt, without any impact effect during passage of the junction of the belt over the spindles, short assembly times and silent running of the driving belt, and consequently a corresponding increase in the service life. A further practical benefit is that the driving belt according to the invention can be produced continuously in large widths and lengths and can be cut to any width, with sharp clean edges being obtained, so that economical stock-keeping is possible.

For the purpose of an objective comparison, three known driving belts and one driving belt according to the invention were tested on the same test apparatus and under the same operating conditions. The known driving belts are of the following types:

A: cotton single-ply, woven to width,
B: polyester single-ply, woven to width,

C: polyamide/ramie fiber double-ply, cut from web material.

In the driving belt according to the invention, the supporting element 2 is composed of polyester fibers 3, cotton fibers 4 and metal filaments 5, and the plastic covering 6 is composed of a polyurethane. By "energy absorption during longtitudinal stretching" is meant that amount of energy which is absorbed as a result of hysteresis in a belt piece 1 m long and 10 mm wide under a longitudinal load alternation of between 5 and 50N.

The results of the comparative tests are reproduced in the following table.

TABLE

|  | Units | Belt type | | | |
| --- | --- | --- | --- | --- | --- |
|  |  | Cotton single-ply A | Polyester single-ply B | Polyamide/ ramie fiber C | According to the invention |
| Property tested |  |  |  |  |  |
| Belt thickness | mm | 1.0 | 0.7 | 0.6 | 0.6 |
| Tension under 1% stretch | N/cm | 15 | 9 | 15 | 53 |
| Tension under 2% stretch | N/cm | 29 | 26 | 29 | 92 |
| Tension under 4% stretch | N/cm | 55 | 77 | 55 | 146 |
| $\mu$-Value belt/spindle | — | 0.13 | 0.10 | 0.10 | 0.10 |
| $\mu$-Value belt/drum | — | 0.27 | 0.8 | 0.7 | 0.7 |
| Average service life | months | 1 | 1.4 | 12 | >18 |
| Energy absorption under longitudinal stretching | Ws | 0.032 | 0.022 | 0.024 | 0.0013 |
| Rotary angle error | degrees | 0.10 | 0.10 | 0.07 | 0.02 |
| Spindle speed | min$^{-1}$ | 14,560 to 14,576 | 14,660 to 14,670 | 14,425 to 14,451 | 14,663 to 14,675 |
| Speed loss of unbraked spindles |  |  |  |  |  |
| 1 spindle braked | % | 0.3 | 0.2 | 0.2 | 0.1 |
| 2 spindles braked | % | >15.0 | 1.5 | 1.5 | 0.6 |
| Spindle acceleration time | sec. | 3.0 | 3.0 | 3.0 | 2.2 |
| Electrostatic charging | kV/cm | 1–6 | 10–16 | 0.5–1.2 | 0.05 |

We claim:

1. A driving belt comprising:
   a textile supporting element composed of multifunctional threads or yarns each including plastic fibers of high breaking strength and heat-resistant natural fibers;
   a non-crosslinked plastic covering connected to said textile supporting element; and
   electrically conductive means, integral with at least said textile supporting element, for imparting antistatic properties to said driving belt.

2. A driving belt as claimed in claim 1, wherein said electrically conductive means comprises electrically conductive filaments in said multi-functional threads or yarns.

3. A driving belt as claimed in claim 2, wherein said electrically conductive filaments comprise metal filaments.

4. A driving belt as claimed in claim 2, wherein said electrically conductive filaments comprise carbon fibers.

5. A driving belt as claimed in claim 1, wherein said electrically conductive means comprises an electrically conductive layer positioned between said textile supporting element and said plastic covering.

6. A driving belt as claimed in claim 5, wherein said electrically conductive layer comprises a soot-containing adhesion-promoting layer.

7. A driving belt as claimed in claim 1, wherein said plastic fibers have a breaking strength of more than 30 cN/tex.

8. A driving belt as claimed in claim 1, wherein said plastic fibers are composed of polyester.

9. A driving belt as claimed in claim 8, wherein said polyester is polyethylene terephthalate.

10. A driving belt as claimed in claim 1, wherein said plastic fibers are composed of polyamide.

11. A driving belt as claimed in claim 1, wherein said natural fibers are heat resistant up to at least 150° C.

12. A driving belt as claimed in claim 1, wherein said natural fibers are composed of cellulose.

13. A driving belt as claimed in claim 12, wherein said cellulose comprises cotton or ramie fiber.

14. A driving belt as claimed in claim 1, wherein said plastic covering is composed of a thermoplastic.

15. A driving belt as claimed in claim 14, wherein said thermoplastic comprises polyurethane.

16. A driving belt as claimed in claim 1, wherein the side of said textile supporting element facing away from said plastic covering is impregnated.

17. A driving belt as claimed in claim 16, wherein said side of said textile supporting element is impregnated with a cross-linked plastic.

18. A driving belt as claimed in claim 17, wherein said cross-linked plastic comprises a cross-linked polyurethane.

* * * * *